No. 632,083. Patented Aug. 29, 1899.
E. E. ANGELL.
ROTARY SHAFT AND JOURNAL BOX.
(Application filed Feb. 23, 1899.)
(No Model.)
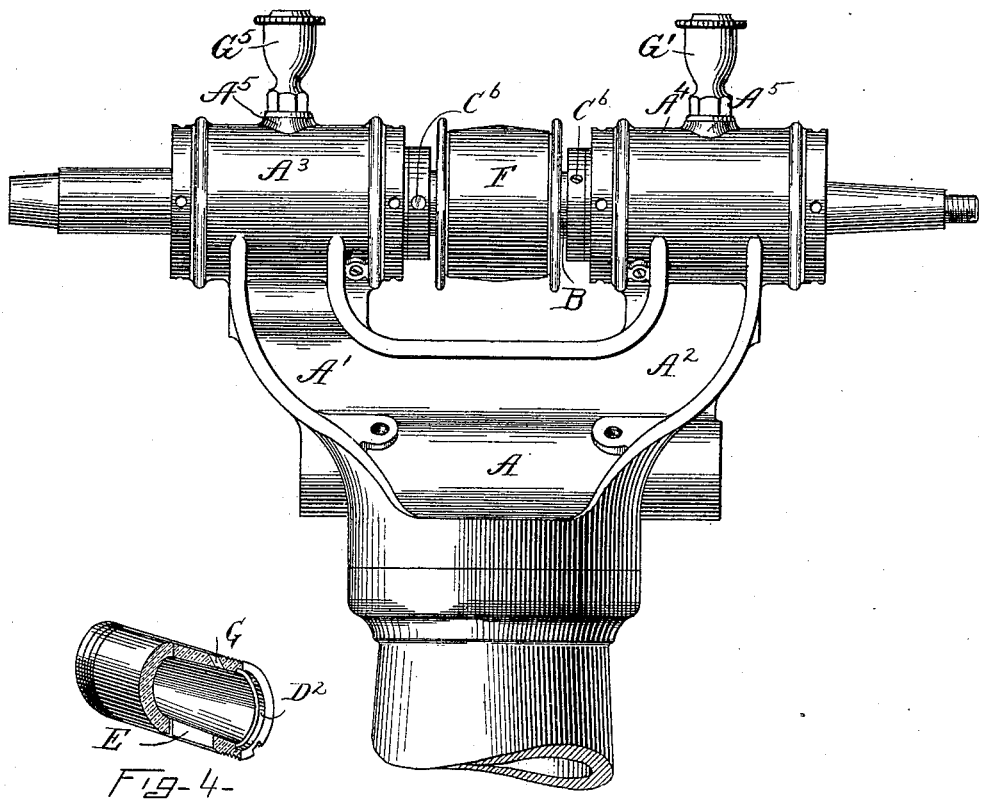
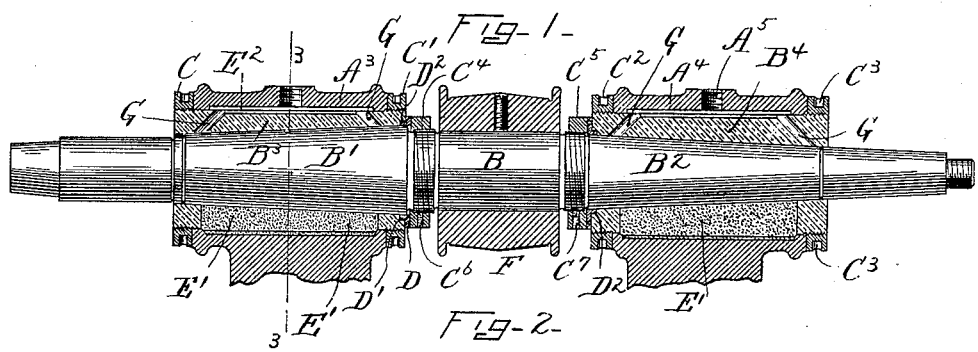
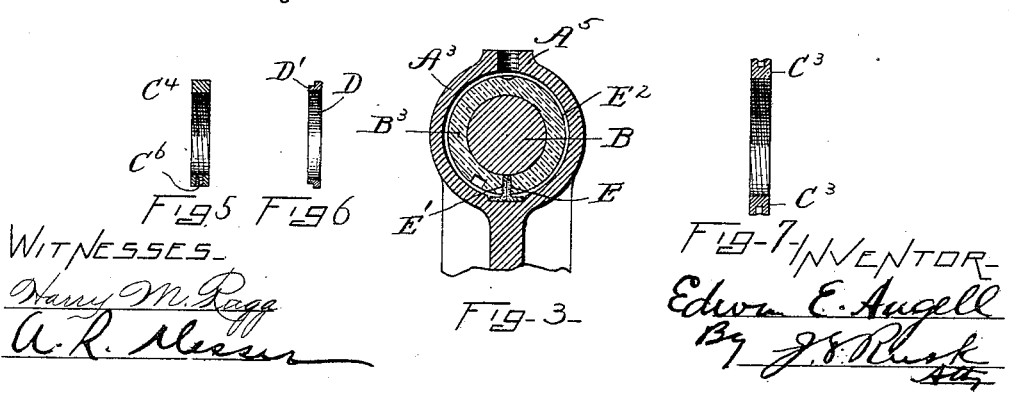
WITNESSES
Harry M. Ragg
A. R. Messer
INVENTOR
Edwin E. Angell
By J. S. Rusk
Atty.

UNITED STATES PATENT OFFICE.

EDWIN E. ANGELL, OF SOMERVILLE, MASSACHUSETTS, ASSIGNOR TO THE AMERICAN SHOE MACHINERY COMPANY, OF PORTLAND, MAINE.

ROTARY SHAFT AND JOURNAL-BOX.

SPECIFICATION forming part of Letters Patent No. 632,083, dated August 29, 1899.

Application filed February 23, 1899. Serial No. 706,562. (No model.)

*To all whom it may concern:*

Be it known that I, EDWIN E. ANGELL, of Somerville, in the county of Middlesex and State of Massachusetts, have invented certain new and useful Improvements in Rotary Shafts and Journal-Boxes, of which the following is a specification.

This invention relates to a novel arrangement of mounting a rotary shaft in its journal-boxes; and its objects are to prevent lateral motion or vibration of the shaft and to take the weight of the taper journal-boxes off of said rotary shaft and to prevent wear on the composition bearings of the journal-boxes; and it is in the nature of an improvement on the machine shown in United States Letters Patent No. 538,055, granted to Ambrose S. Vose, dated April 23, 1895.

In the accompanying drawings the invention is illustrated in a machine for treating boots and shoes, and on the left-hand end of the shaft a suitable cutter is in practice mounted for trimming the edges of the soles of the boots and shoes.

My invention consists of certain novel features hereinafter described, and particularly pointed out in the claims.

In the accompanying drawings, which illustrate a construction embodying my invention, Figure 1 is a front elevation of a portion of a machine embodying my invention. Fig. 2 is a longitudinal sectional view through the upper part of the machine and showing the shaft in full lines. Fig. 3 is a cross-sectional view on the line 3 3, Fig. 2. Fig. 4 is a detail perspective view of one of the taper journal-boxes, shown partly in section. Figs. 5 and 6 are sectional views of a collar and its washer. Fig. 7 is a sectional view of one of the threaded collars or rings.

Like letters of reference refer to like parts throughout the several views.

The yoke-shaped casting A is provided with arms $A'$ $A^2$, having hollow bearings $A^3$ and $A^4$ of any suitable construction, such as is commonly employed in boot and shoe trimming machines, the framework A being supported upon an upright column. The yoke-shaped framework A has a cylindrical shaft B, which is made tapering or conical at its opposite ends to form tapering journals $B'$ $B^2$. Coöperating with these tapering journals are the journal-boxes $B^3$ and $B^4$, which are shown as cylindrical in shape to fit into and extend through the hollow bearings $A^3$ and $A^4$. The journal-boxes $B^3$ and $B^4$ are adjustably secured within the hollow bearings $A^3$ and $A^4$ against longitudinal movement by means of threaded collars or rings C, $C'$, $C^2$, and $C^3$ engaging screw-threads on the outside periphery of the journal-boxes $B^3$ and $B^4$ at their opposite ends, and the said threaded rings or collars abut against the opposite ends of the bearings $A^3$ and $A^4$, as shown in Fig. 2. The shaft B is prevented from moving longitudinally by means of the ring $C^4$, fast on the shaft B by the set-screw $C^6$, the said ring or collar $C^4$ coöperating with the journal-box $B^3$ and by the ring or collar $C^5$ coöperating with the journal-box $B^4$, held in the position shown by means of the set-screw $C^7$. It will be obvious that the journal-boxes $B^3$ and $B^4$ may be adjusted longitudinally on their journals as the said box becomes worn, so that the same journal-box may be used until it is practically worn out, while at the same time a true bearing for the shaft is obtained, which prevents any lateral movement at either end and avoids any vibration of the same which would produce an imperfect action of the operating-tube carried by the shaft B.

Mounted between each of the collars $C^4$ and $C^5$ and the ends of the journal-boxes $B^3$ $B^4$ is a loosely-mounted washer D to lessen the friction between the two bearings. This washer D is provided with an annular lip $D'$, which extends into the annular recess $D^2$ at the inner end of each taper journal-box for the purpose of supporting the weight of the same, so that it will not bear upon the shaft B. This arrangement prevents the rapid revolution of the friction-washer D when the collars $C^4$ $C^5$ are not brought into contact with said washer, as said washer will only revolve when considerable pressure from said collars $C^4$ and $C^5$ is brought to bear against them. The said washer also prevents the collars from working in on the bearings of the journal-boxes, which are made of composition metal.

As shown in Fig. 3, the taper journal-boxes $B^3$ and $B^4$ are each provided on their under sides with a slot E, into which felt E' is introduced. In the revolution of the shaft oil, which passes down from the usual oil-cups G, mounted in the openings $A^5$ through the oil-chamber $E^2$ between the hollow bearings $A^3$ and $A^4$ and the taper journal-boxes $B^3$ and $B^4$, is drawn up by the felt from the oil-chamber, and as the machine runs and the temperature rises the felt wipes and lubricates the bearing. The oil also passes to the shaft B through the holes G in the journal-boxes $B^3$ $B^4$ and lubricates the shaft.

The shaft B is fixed fast to a pulley F, which transmits power to said shaft from any suitable source by a belt.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In a machine of the character specified, a rotary shaft provided with journals extending in opposite directions, journal-boxes having holes through which said journals extend, bearings for said journal-boxes, an oil-chamber between each journal-box and its bearing, an oil-cup communicating with each chamber for supplying oil thereto, and passages through each bearing between the oil-chamber and the shaft.

2. In a machine of the character specified, a rotary shaft provided with journals extending in opposite directions, journal-boxes having holes through which said journals extend, bearings for said journal-boxes, an oil-chamber between each journal-box and its bearing, an oil-cup communicating with each chamber for supplying oil thereto, there being a slot in the under side of each journal-box, and felt in each slot and oil-chamber adapted to take up oil from said oil-chamber and lubricate the bearing.

3. In a machine of the character specified, a rotary shaft provided with journals extending in opposite directions, journal-boxes having holes through which said journals extend, bearings for said journal-boxes, an oil-chamber between each journal-box and its bearing, an oil-cup communicating with each chamber for supplying oil thereto, there being passages through each bearing between the oil-chamber and the shaft, there being a slot in the under side of each journal-box, and felt in each slot and oil-chamber adapted to take up oil from said oil-chamber and lubricate the bearing.

4. In a machine of the character specified, a rotary shaft provided with tapering or conical journals extending in opposite directions and provided with screw-threads near the center, journal-boxes having tapering holes through which said journals extend and each having an inner annular recess, bearings for said journal-boxes, adjustable means at the opposite ends of said bearings to adjust said boxes on said tapering journals and to lock said boxes in their adjusted positions, a friction-washer for each box having an annular lip extending into said annular recess of each box, and internally-threaded collars adapted to engage the screw-threads on the shaft and to hold each washer in position, and means for holding each collar in its adjusted position.

In testimony whereof I have signed my name to this specification, in the presence of two subscribing witnesses, this 15th day of February, A. D. 1899.

EDWIN E. ANGELL.

Witnesses:
A. L. MESSER,
C. A. STEWART.